United States Patent
Marmet et al.

(10) Patent No.: US 10,943,483 B2
(45) Date of Patent: Mar. 9, 2021

(54) COLLABORATIVE IMPROVEMENT OF A VEHICLE'S POSITIONING

(71) Applicant: CENTRE NATIONAL D'ETUDES SPATIALES, Paris (FR)

(72) Inventors: François-Xavier Marmet, Muret (FR); Lionel Ries, Viviers les Montagnes (FR); Nicolas Capet, Toulouse (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 264 days.

(21) Appl. No.: 15/788,924

(22) Filed: Oct. 20, 2017

(65) Prior Publication Data

US 2018/0114441 A1 Apr. 26, 2018

(30) Foreign Application Priority Data

Oct. 25, 2016 (EP) .................................. 16306400

(51) Int. Cl.
*G08G 1/16* (2006.01)
*G01C 21/30* (2006.01)
(Continued)

(52) U.S. Cl.
CPC ............. *G08G 1/163* (2013.01); *G01C 21/30* (2013.01); *G01S 5/0257* (2013.01); *G01S 19/48* (2013.01);
(Continued)

(58) Field of Classification Search
CPC ... G08G 1/163; G08G 1/09675; H04W 4/027; H04W 4/46; H04W 4/024; H04W 4/44;
(Continued)

(56) References Cited

U.S. PATENT DOCUMENTS

| | | | |
|---|---|---|---|
| 2007/0222674 A1* | 9/2007 | Tan ........................ | G01S 19/49 342/357.32 |
| 2010/0164789 A1* | 7/2010 | Basnayake ............ | G01S 5/0072 342/357.23 |
| 2018/0083914 A1* | 3/2018 | Yamaura ............... | H04W 12/12 |

FOREIGN PATENT DOCUMENTS

| | | |
|---|---|---|
| EP | 2169503 A2 | 3/2010 |
| EP | 15305948.0 A1 | 12/2016 |

(Continued)

OTHER PUBLICATIONS

Zarzosa et al. "Relative Positioning for Collision Avoidance Systems" (REPOSIT), FP6 Project, Final report, 2007, pp. 1-36. The text is on the web at www.ist-reposit.org.

(Continued)

*Primary Examiner* — Nga X Nguyen
(74) *Attorney, Agent, or Firm* — Meagher Emanuel Laks Goldberg & Liao, LLP.

(57) ABSTRACT

The invention discloses a positioning device configured to acquire its own GNSS position, the GNSS positions of rovers in an area around the positioning device and the relative positions of the positioning device to the rovers. The positioning device is configured to calculate a best-fit position based on this data and their confidence indexes. The positioning devices may communicate directly or through a navigation assistance centre. The best-fit position may be provided with indexes of confidence, availability and integrity. In some embodiments, the positioning device of the invention may be robust enough to generate commands to the driving controls of an autonomous vehicle.

15 Claims, 8 Drawing Sheets

(51) Int. Cl.
*G01S 19/51* (2010.01)
*H04W 4/44* (2018.01)
*H04W 4/024* (2018.01)
*H04W 4/46* (2018.01)
*H04W 4/02* (2018.01)
*G01S 19/48* (2010.01)
*G01S 5/02* (2010.01)
*G01S 5/00* (2006.01)
*G08G 1/0967* (2006.01)
*H04L 29/08* (2006.01)

(52) U.S. Cl.
CPC ............ *G01S 19/51* (2013.01); *H04W 4/024* (2018.02); *H04W 4/027* (2013.01); *H04W 4/44* (2018.02); *H04W 4/46* (2018.02); *G01S 5/0072* (2013.01); *G08G 1/09675* (2013.01); *H04L 67/26* (2013.01)

(58) Field of Classification Search
CPC ...... G01S 19/51; G01S 5/0072; G01S 5/0257; G01S 19/48; G01S 19/45; G01S 19/43; G01C 21/30; H04L 67/26
See application file for complete search history.

(56) References Cited

FOREIGN PATENT DOCUMENTS

| | | |
|---|---|---|
| EP | 3249429 A1 | 11/2017 |
| EP | 3276561 A1 | 1/2018 |
| WO | 2013/166090 A1 | 11/2013 |
| WO | 2016008991 A1 | 1/2016 |
| WO | 2016034622 A1 | 3/2016 |
| WO | 2016034623 A1 | 3/2016 |

OTHER PUBLICATIONS

Garello et al. "Peer-to-Peer Cooperative Positioning Part II: Hybrid Devices with GNSS & Terrestrial Ranging Capability" Inside GNSS, 2012.
Basnayake et al. "Can GNSS Drive V2X?" GPS World, 2010. The text is available on the web at gpsworld.com.
European Search Report for 16306400.9 dated Aug. 14, 2017.

* cited by examiner

COLLABORATIVE IMPROVEMENT OF A VEHICLE'S POSITIONING

FIELD OF THE INVENTION

The invention relates to a collaborative positioning system for vehicles. More specifically, according to the invention, a plurality of vehicles acquire and exchange their relative positions and absolute GNSS positioning data to improve their own absolute positioning.

BACKGROUND

More and more vehicles (cars, motorcycles, buses, etc.) are equipped with GNSS receivers, either natively mounted by the vehicle manufacturer, or in the form of a detachable device brought in by the operator of the vehicle.

More and more applications rely on localization data, notably on-board vehicles, either for professional use or for leisure use. For instance, assisted navigation such as near-real time route planning and monitoring is more and more important to optimize transportation of persons and/or delivery of goods. Different types of vehicles may be used for transportation: buses, trucks, cars, motorcycles, or in a number of use cases, other mobile ground—such as trains—air or sea transportation vehicles. Beyond the standard model of private ownership and use, these vehicles may be operated under various business models all requiring efficient management of the fleet of vehicles and of the crews. A fleet of vehicles may be operated by a public authority or a private entity that will use route planning and monitoring to improve the rate of utilization of its resources and the quality of service delivered to its customers. The basics of route planning are beyond the scope of this disclosure, but it is important to note that this function relies notably heavily on a good availability of precise positioning data. Increasing performance in precision, availability and integrity of positioning data will allow better use of the resources of the fleet management entity, i.e. staff and vehicles. Even individual users will benefit of an improvement in aided navigation resulting from increased precision and accuracy of positioning data.

Vehicle safety applications, such as Adaptive Cruise Control (ACC) and Blind Spot Detection normally rely on ranging sensors that produce relative positioning in the immediate vicinity of a vehicle (typically tens of cm to a few hundred meters). But for the design of autonomous cars, an integration of different positioning techniques (absolute position produced by GNSS and relative positioning produced by sensors) is contemplated to allow a better integration of long range and short range positioning and to provide redundancy. For this application, the specification for precision, availability and integrity will still be higher.

But GNSS has some native limitations that will be discussed below, specifically in urban environments.

Navigation receivers rely on L-Band RF (radio frequency) signals transmitted by Medium Earth Orbiting satellites, which are generally included in constellations comprising tens of them to cover most of the surface of the earth, such as the GPS™ (US), Galileo™ (Europe), Glonass™ (Russia) and Beidou™ (China). These constellations are designated under the generic acronym of GNSS (Global Navigation Satellite System).

GNSS carrier signals are modulated by a pseudo-random code and a navigation message which allow calculation of a pseudo-range between the receiver and a definite satellite. With a minimum of four pseudo-ranges, it is possible to calculate Position, Velocity and Time (PVT) of the receiver. In receivers of the type which are used by consumers, the position information is the one which is directly used to compute the navigation solution.

PVT measurements are affected by a number of errors, some of which are intrinsic to the principle of measurement used (i.e, due to the deviation in trajectory of the RF signals through the atmosphere—ionosphere and troposphere—due to variations in the orbits of the satellites), intrinsic to the receiver and satellites imperfections (clock biases for instance), or intrinsic to some configurations of the satellites in view at a moment in time (i.e. elevation of the satellites over the horizon; low dispersion of visible satellites—high Dilution Of Precision or DOP). A number of corrections can be used to mitigate these errors, either with the use of specific processing techniques which are only available to certain types of receivers (i.e. bi-frequency receivers can mitigate ionospheric errors up to a gain of precision from a few tens of meters to a few meters or better, depending on the quality of the corrections). This is known as Precise Point Positioning or PPP. Differential GPS (DGPS) or Real Time Kinematics (RTK) provide a precision of a few tens of centimetres thanks to an integration of outside information (relative positioning vis-à-vis a number of fixed reference stations with known positions).

It is more difficult to mitigate in a consistent and efficient manner some errors which depend on the position of the receiver, notably when this position is environed by a number of objects which reflect the navigation RF signals and/or mask a number of the satellites which should be in line of sight (LOS) at a moment in time. In such conditions, the precision of the calculation of the PVT may be quite poor, all other causes of errors being equal, both at the time of acquiring a GNSS signal and at the time of tracking said signal.

In urban canyons (i.e. streets in between skyscrapers) or on roads along trees, plantings or reflective structures, multipath will not only increase the error in the determination of the pseudo-range of a satellite (User Equivalent Range Error or UERE), but also the (Geometric) Dilution Of Precision, (GDOP or DOP), because the field of view of the antenna will be narrower thus limiting the increase in precision due to the use of additional satellites.

The degradation in UERE is due to the signal impairments of the definite satellite which is acquired or tracked by a tracking loop. Tracking of a satellite relies on a maximization of a correlation function between the acquired code signal and a number of local replicas generated by the receiver of the code signals which are specific to each satellite. The correlation functions will be corrupted by multipath and the satellite may be not correctly acquired or may be lost. Even if signal tracking is still achievable, signal impairments will affect the correlation function's shape, thus degrading the pseudo-range estimation, and the UERE.

Mitigation techniques applicable at the level of individual receivers have been designed and implemented for many years, notably based on specific processing applied at the correlation stage. Also, some mitigation techniques may be applied at the antenna level.

In lieu or in addition to these techniques, cooperative positioning between rovers (which may include, for example, buses, trucks, cars, motorcycles, or other mobile transportation devices containing a receiver or receivers—the use of "rover" in the present document is interchangeable with the use of "vehicle") has been discussed notably with the deployment of Vehicle to Vehicle (V2V) and of Vehicle to Infrastructure (V2I) communications, the infrastructure being defined as a Cooperative Vehicle Infrastructure Systems (CVIS) comprising a number of nodes of a communication network along the roads and possibly control and command centres, either automated or manned. CVIS is or will be providing useful data (specificities of Points of Interest—POI—local news along the route, for instance), assistance data (planned road-works, accidents, jams, suggested diversions en-route or any type of navigation aid data) or safety data (V2V relative distance and absolute or relative speeds measurement for minimum distance and blind-spot alerts or collision avoidance, including automatic breaking, etc.).

Ultimately, autonomous vehicles will have to rely heavily on vehicle positioning data that is precise enough and has sufficient availability and integrity. For V2V safety applications, accuracy may be defined at road level (which road is a vehicle travelling on?), inter-lane level (which lane in the road is a vehicle travelling on?) or intra-lane level (where in a definite lane is a vehicle located?). Specification of the precision to be achieved varies from better than 5 m at the road level up to better than 1 m at the intra-lane level. Moreover, the true challenge may indeed be to maintain these levels of precision in all environments, including those heavily affected by multipath reflections like urban canyons.

Some attempts have been made at developing a cooperative approach to improve precision and/or availability of positioning data. Positioning of a first rover may be obtained by combining the output of the GNSS receiver of said first rover with the output of the GNSS receivers of other rovers in the vicinity of the first rover and of data representative of a relative positioning of the first rover in relation to a selection of the other rovers. The latter data may be produced at the output of optical, RF or LIDAR sensors having a ranging capability. Data fusion may be performed in a peer-to-peer architecture or in a centralized architecture. V2V and V2I links tend to use a Dedicated Short Range Communication (DSRC) device, with some proposals for standardisation. A DSRC device may have a ranging capability. Prototypes of one or more of these types of systems are disclosed notably in: Zarzosa et al., "Relative Positioning for Collision Avoidance Systems" (REPOSIT), FP6 Project, Final report, December 2007; Basnyake et al., "Can GNSS Drive V2X?", GPS World, October 2010; Garello et al., "Peer-to-peer cooperative positioning—Part II, Hybrid Devices with GNSS and Terrestrial Ranging Capabilities", Inside GNSS, July-August 2012.

These systems have a number of drawbacks. Notably, they do not allow provision with off-the shelf equipment of a predictable confidence interval of the precision of the positions that they determine.

Nor do they provide a measurement and/or prediction of the availability and/or integrity of the measurements.

Among other advantages, the present invention discloses a solution to overcome the previously cited drawbacks.

SUMMARY OF THE INVENTION

A purpose of the present invention is to meet this need. To this effect, the invention discloses notably a positioning device that acquires GNSS positions of a plurality of rovers and a plurality of relative positions with regard to at least some of the rovers, together with confidence indexes of these measurements and thus of the positioning device.

To this effect, this invention discloses a positioning device comprising: a GNSS unit configured to acquire GNSS signals from one or more GNSS constellations and to compute a first position of the positioning device based on a PVT calculation from the GNSS signals; a position sensing unit configured to acquire relative positions from the positioning device of one or more rovers, and to determine confidence indexes of said relative positions; a communication link configured to make available to the positioning device the time-stamped GNSS PVT positions of some rovers with associated confidence indexes; and position determining logic configured to compute a second position of the positioning device based on inputs from the GNSS unit from the position sensing unit and from the communication link.

Advantageously, the position determining logic is further configured to compute the second position by calculating a best fit between a first geometry including a first group of segments connecting the first position of the positioning device and each of the GNSS PVT positions of the at least some of the rovers and a second geometry including a second group of segments connecting the first position of the positioning device and each of the relative positions of the at least some of the rovers to the positioning device.

Advantageously, the best-fit is computed by determining a best-fit segment, points of which have a minimal Euclidian distance to selected pair of points, each point in the selected pair belonging to one of the first group or the second group.

Advantageously, the position determining logic is further configured to compute the second position by calculating a confidence circle of the second position that is determined as a smallest circle including origins of selected segments connecting a candidate second position to selected points located in an intersection of one or more pairs of confidence circles, wherein a pair of confidence circles is attached to a rover and a first confidence circle in the pair relates to the rover GNSS position and the second confidence circle in the pair relates to the rover relative position to the positioning device.

Advantageously, the position determining logic is further configured to compute the second position by fracturing confidence circles around the first position of the rover and the GNSS PVT positions of the one or more rovers into a plurality of small features, pairs of a first small feature in a first confidence circle and a second small feature in a second confidence circle determining segments connecting one of the rover and one of the other rovers to another one of the rover and one of the other rovers, a best fit solution being determined by selecting a combination of rovers for which the segments best match a geometry of relative positions of the one and other rovers.

Advantageously, the position determining logic is further configured to weigh its inputs from the GNSS unit, the position sensing unit and of the communication link based on a confidence index of one or more of the rover, its GNSS position or its relative position.

Advantageously, the position determining logic is further configured to receive and process inputs from a route planning logic, said inputs being used to update the confidence index of the GNSS position and of a relative position of a rover based on a map matching algorithm.

Advantageously, the position determining logic is further configured to calculate one or more of an index of availability or an index of integrity of the second position.

Advantageously, one or more of the GNSS unit and the position determining logic are further configured to generate a first position when none is available at an epoch by propagating a last known first position, using one or more of a velocity or a direction of motion of the positioning device.

Advantageously, the position sensing unit comprises one or more position sensors with a RF transmit and/or receive (T/R) module, said T/R module configured to measure a range to another T/R module by calculating a time-of-flight between the said T/R modules and to determine an angle of the range by measuring a direction-of-flight between the said T/R modules.

Advantageously, the communication link is one or more of a vehicle-to-vehicle (V2V) communication link or a vehicle-to-infrastructure (V2I) communication link.

Advantageously, one or more of the V2V or the V2I communication links are a DSRC communication link.

Advantageously, the communication link uses a Publish/Subscribe protocol.

Advantageously, the communication link is configured to transmit and/or receive data to/from a navigation assistance centre.

The invention also discloses a positioning method comprising: acquiring at a GNSS unit GNSS signals from one or more GNSS constellations and computing a first position of a positioning device based on a PVT calculation from the GNSS signals; acquiring at a position sensing unit relative positions to one or more rovers, and determining confidence indexes of said relative positions; acquiring at a communication link, the time-stamped GNSS PVT positions of some rovers with associated confidence indexes; and computing at a position determining logic a second position of the positioning device based on inputs from the GNSS unit, from the position sensing unit and from the communication link.

The invention also discloses a positioning system comprising: I) a plurality of positioning devices on-board rovers, each positioning device comprising: a GNSS unit configured to acquire GNSS signals from one or more GNSS constellations and to compute a first position of the positioning device based on a PVT calculation from the GNSS signals; a position sensing unit configured to acquire relative positions from the positioning device to one or more rovers, and to determine confidence indexes of said relative positions; a communication link configured to make available to the positioning device the time-stamped GNSS PVT positions of some rovers with associated confidence indexes; and position determining logic configured to compute a second position of the positioning device based on inputs from the GNSS unit, from the position sensing unit and from the communication link; II) a navigation assistance centre comprising: an access to a database of the plurality of rovers, drivers and positioning devices with corresponding IDs; communication links to the plurality of positioning devices, said communication links configured to acquire at least some GNSS positions and/or relative positions of the plurality of positioning devices.

Among other advantages, the invention provides processes to assess an integrity of the measurements. Also, in some locations, the availability of a plurality of GNSS constellations and of augmentation systems possibly provides increased precision and redundancy.

The invention may be implemented with a central facility that distributes the rover measurements to subscribers. Alternatively, or in combination, the invention may be implemented in a rover-to-rover, i.e. peer-to-peer, architecture without the need of a central server.

The invention may be implemented in standard devices, having low Size, Weight and Power, with software upgrades only, and is therefore easy and not costly to implement or deploy with legacy rovers.

Thanks to the benefits brought by the invention and its various embodiments, it is also possible to greatly improve the navigation of the rovers, specifically in perturbated environments like urban environment, notably because other data than positioning data, for instance instantaneous data about traffic congestion or roadworks may be shared between the rovers, and processed locally.

The invention may be easily combined with some improvements that will allow taking due account of traffic history, accidents, road closures, speed limits, points of interest, filling or charging stations, and local data about multipath reflections.

BRIEF DESCRIPTION OF THE DRAWINGS

The invention and its advantages will be better understood upon reading the following detailed description of a particular embodiment, given purely by way of non-limiting example, this description being made with reference to the accompanying drawings in which.

DETAILED DESCRIPTION

Figure 1:
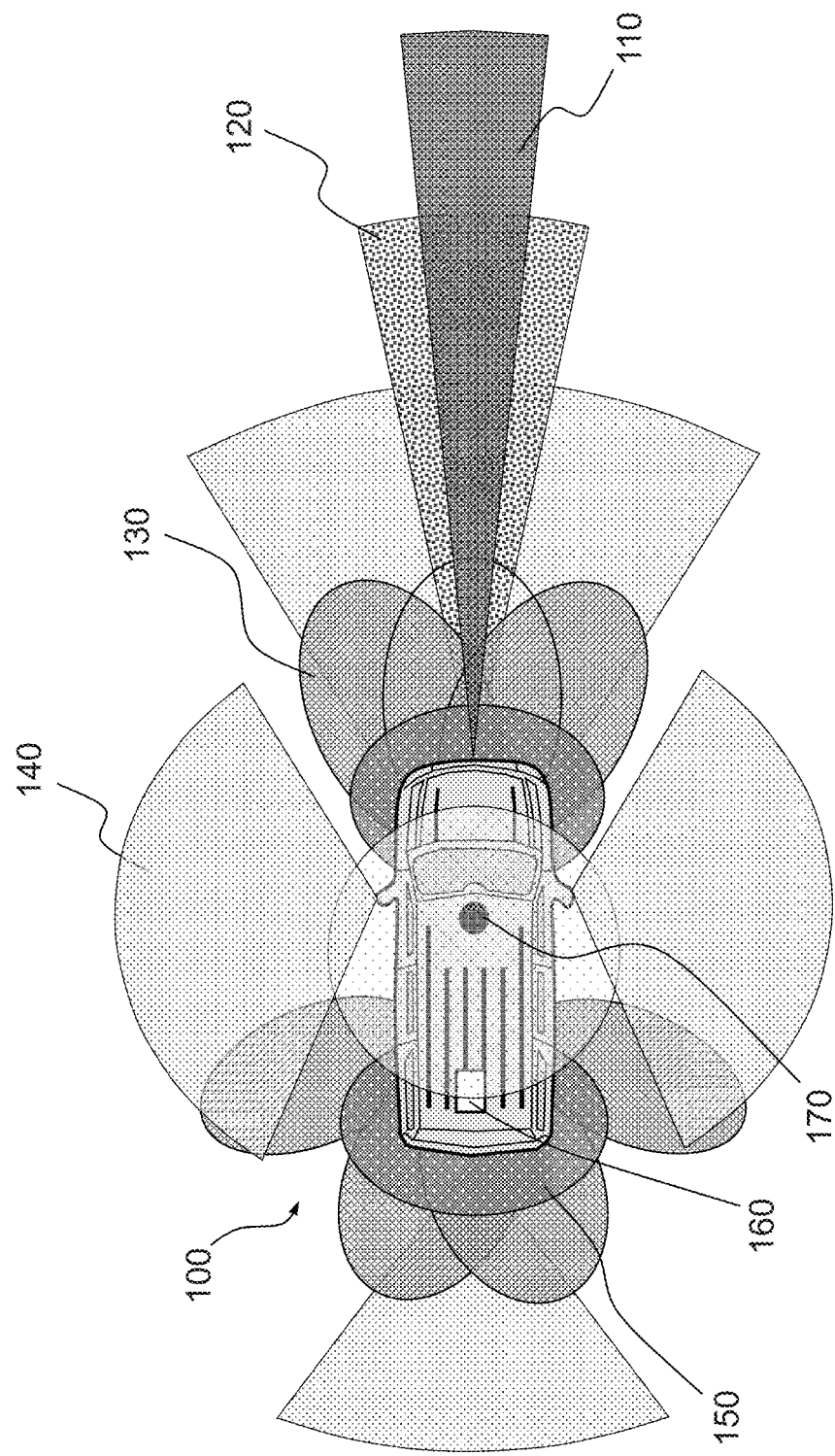
FIG. 1 represents a schematic of a vehicle enabled to implement various positioning technologies according to the prior art.

FIG. 1 represents a schematic of a vehicle enabled to implement various positioning technologies according to the prior art.

Credit for this schematic is given to Novatel™, the GNSS equipment maker. Even if it is still theoretical—no car with all the sensors and functions depicted on the schematic seems to be currently on the market—it does illustrate the importance of sensors in future automotive vehicles. And sensors mean signal processing and data fusion. The annual famous Consumer Electronics Show of Las Vegas, a long standing must for component and device makers is now becoming a "place to be" for most automotive platform and equipment manufacturers. Concept cars presented there are replete with radars, cameras, LIDARS, ultrasound sensors used to position the car in its close environment, detect obstacles and provide navigation and/or driving assistance to the driver or directly control the vehicle. Technologies that have been used for long on aerospace or marine transport platforms now find their way on the wheeled vehicles.

As displayed on FIG. 1, a vehicle 100 is equipped with:
a long-range radar 110, that is used as the main sensor to control Adaptive Cruise Control (ACC), i.e. a function whereby a vehicle cruising at a preset speed will be tracking the vehicle ahead, automatically brake if the said vehicle reduces its speed and re-accelerates up to the preset speed when the vehicle ahead accelerates again; ACC looks ahead and typically has a range of a few meters to a few hundreds of meters;

a LIDAR 120 may be provisioned as a redundant or supplemental sensor to control the ACC function, or to detect other obstacles on the route (pedestrians, cyclists, animals, debris, etc.); the LIDAR may control Emergency Braking and Collision Avoidance functions;

short/medium range radars 130 provide Blind Spot Detection, Collision Warning, etc.;

cameras 140 may provide images used, either alone, or in combination with other sensors, to control various functions, such as Surround View, Park Assistance, Traffic Sign Recognition, Lane Departure Warning;

Ultrasound sensors 150 mostly provide input for the Park Assist function.

FIG. 1 also displays an RF communications module 160. RF communications may be used for different applications that may not be mission critical, such as toll collection. A quasi-standard emerges for these communications, known as Dedicated Short Range Communications or DSRC. In the US and Europe, a bandwidth of a few tens of MHz (30 MHz in the US) has been allocated in the 5.9 GHZ band. DSRC may be used to transmit information or control commands both ways. It can also be used for determining a distance between two transmit/receive (T/R) modules. This determination is made by a calculation of Time Of Arrival (TOA) or Time Of Flight (TOF) of the RF wave front travelling from the T module to the R module and back. If the R module is configured to apply some antenna diversity, either physically or by software controlling the T/R modules, Direction Of Arrival (DOA) or Direction Of Flight (DOF) may also be determined, thus allowing a determination not only of a distance between the T/R modules but a full determination of a 3D relative positioning of the T/R modules. This communication and derived relative positioning may be performed in a V2C mode or in a V2I mode. In the latter case, the sensor embarked on the rover will measure range and orientation in communicating with transponders (active or passive) positioned on the road infrastructure.

In addition, FIG. 1 displays a GNSS module 170. The GNSS receiver on-board the vehicle may be only capable to receive signals from a single constellation (GPS2 or GPS3, Glonass, Beidou, Galileo, other) or it may be capable to receive more than one (multi-constellation receiver). In a standard mode, the GNSS receiver will be configured to receive the publicly available signals only. But it may also be configured to receive signals that are protected to ensure that they only deliver information to registered users (an example is the future Galileo Commercial Service) or are reserved for Government authorities. As already explained a GNSS receiver delivers PVT data. It may deliver information that is augmented, of the Satellite Based Augmentation System (SBAS) type, such as EGNOS or WAAS, or of the Ground Based Augmentation System (GBAS), such as Differential GPS (D-GPS) or RTK (Real Time Kinematics). SBAS and GBAS may allow better precision by providing corrections of the ionospheric errors, orbit calculation data or algorithms/tables to calculate corrections to the biases of the satellites and/or receivers. A GNSS receiver is normally configured to receive signals in a single frequency band for a definite constellation. It may also be configured to receive signals on two different frequencies, or even more. The Galileo constellation will for instance transmit navigation signals on 3 different frequencies. Processing signals received on at least two different frequencies allows an easy elimination of the carrier phase integer ambiguities, thus leading to much more accurate pseudo-ranges and PVT. At the end of the day, cumulating a number of augmentation techniques (multi-frequency, SBAS or GBAS, etc.) it is possible to improve accuracy at the decimeter level.

Despite this excellent level of precision, most designers of autonomous vehicles, at the present time, do not contemplate relying on GNSS receivers to deliver vehicle position data to be used in mission critical applications such as ACC, Emergency Braking, Collision Avoidance, etc.

This is mostly because availability and/or integrity of a GNSS position cannot be guaranteed throughout navigation, specifically through dense or semi-dense urban areas. This is caused by a number of phenomena that affect availability and consistency of the measurements (i.e. integrity) such as Time to Fix (i.e. the time needed to acquire a position on a cold start), multi-path reflections (as already discussed), or Dilution Of Precision, i.e. the fact that the precision of measurement will vary significantly over time based on the position of the rover and time of the day, because the relative positions of the satellites in space will change over time, with some configurations where satellites are aligned or about, and their number needs to be higher for a target precision.

Each of these impediments may be eliminated or mitigated to a certain extent, as will be discussed at various passages of this description. But the main purpose of this invention is to bring a system level solution allowing prediction and guarantee of availability and integrity of position measurements that rely, at least partly, on GNSS measurements.

Figure 2:
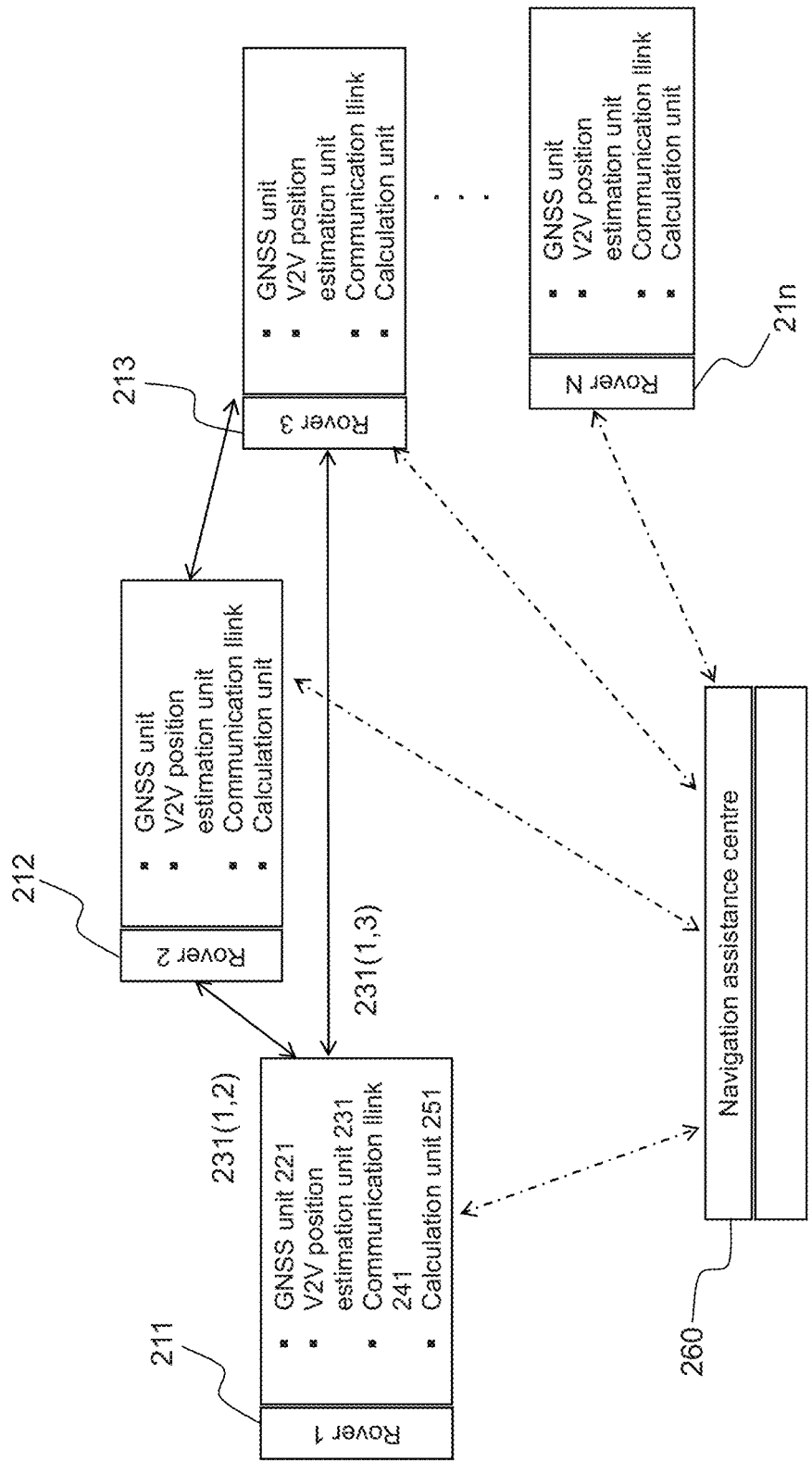
FIG. 2 represents a functional architecture to implement the invention according to some of its embodiments.

FIG. 2 represents a functional architecture to implement the invention according to some of its embodiments.

The system level solution to the problem mentioned above relies mainly on provision of a number of capabilities on-board each vehicle 211, 212, 213, 21*n* . . . :

A PVT computation unit or GNSS receiver 221;

A V2V and/or V2I position estimation unit 231, acquiring one or more rover positions 231 (1, 2), 231 (1, 3), etc.;

One or more of a V2C and/or V2I communication links, 241;

A calculation unit 251.

The PVT computation unit 221 may be a standard GNSS receiver of the type described above, i.e. with an antenna assembly acquiring navigation signals from one or more constellations at one or more frequencies. It may be a receiver with one or more of additional capabilities to authenticate the navigation signals to mitigate a risk of spoofing or tampering, or to mitigate multipath reflections. It may be a receiver with additional hardware and software capabilities, of a type disclosed by PCT application published under n°WO2016/034623 assigned to the same applicant as the instant application, wherein an antenna arrangement is configured to generate a variable radiating pattern of a predetermined scheme. It may be a receiver with an antenna arrangement configured to selectively acquire LOS signals, so as to eliminate the non-LOS signals, such as those of the type disclosed by European patent application filed under n°EP16305611.2 assigned to the same applicant as the instant application. It may be a receiver with additional hardware and/or software capabilities, notably to acquire and process error corrections transmitted by a GBAS or SBAS service, or calculated locally, in a stand-alone mode or in a collaborative mode, such as those of a type disclosed by PCT application published under n°WO2016/008991, assigned to the same applicant as the instant application, whereby a confidence index of a navigation solution is calculated by the receiver from various parameters, or by WO2016/034622, assigned to the same applicant as the instant application, whereby code and phase measurements of other rovers are acquired at the rover, or by European patent application filed under n°EP15305948.0, assigned to the same applicant as the instant application, whereby the receiver is enabled to select an optimal error correcting mode.

Advantageously, it may be advisable to provision an anti-spoofing mechanism that can defend the GNSS receiver against tampering. It has been demonstrated that the navigation systems of automatic cars can be easily penetrated and the car hijacked. In addition to the reference already cited, it may be contemplated to implement an authentication of the GNSS position of a rover of the type disclosed by EP16305972.8, assigned to the same applicant as the instant application, wherein one or more of raw data or raw signals are captured at an output of the GNSS receiver to be compared with simulated raw data (respectively raw signal) corresponding to the PVT output by a receiver. If the simulated raw data and/or raw signals do not correspond to the PVT output by the receiver, it is a token of an attempted tampering. This embodiment may be quite beneficial notably when a rover carries a high-value payload, that absolutely needs to be protected. In this case, it may be worth having a GNSS signal simulator on-board the rover to perform real-time or near-real time authentication. Alternatively or in addition, authentication may result from a connection to a server containing a database of suspect receivers, based on prior attempts at tampering/spoofing.

Other kinds of receivers, possibly with other types of add-on, hardware or software, may be envisaged without departing from the scope of the instant invention. A common feature, that is present in all receivers, is an availability, at the output of the receiver, of one or more confidence indexes of the PVT calculation. This data is generally available in the NMEA format originally defined by the US National Marine Electronics Association, and is configured, according to the invention, to be processed, as the PVT data, by the calculation unit 251.

The V2V and/or V2I position estimation unit 231 may be a sensor arrangement with a LOS ranging capability of an RF, acoustic or optical type, such as sensors displayed on FIG. 1 (110, 120, 130, 140, 150). For instance, the V2V position estimation unit 231 may measure positions of Rover 2 and/or Rover 3, 231 (1, 2) and 231 (1, 3) respectively. In some embodiments, such sensors also have a direction finding capability. Preferably, the V2V and/or V2I position estimation unit 231 has a capability to identify a type and status of the objects in LOS, notably to determine if it is moving or not, if it is another car or lorry and, if so, its direction and speed of movement, if it is a cyclist or a pedestrian, if it is a tree alongside the road, or a debris. Only some of these capabilities may be implemented. Notably, only a V2V capability may be implemented. According to advantageous aspects of the invention, the V2V and/or V2I position estimation unit 231 has a capability to determine and output to the calculation unit 251 a confidence index of its measurements.

The V2V and/or V2I communication link(s) 241 may be implemented using a DSRC T/R module. The on-going standardization work is directed to a specific variant of the I3E 802.11 family of standard related to the use of some ISM bands for point-to-point or point-to-multipoint RF communications. This variant is known as 802.11 p, adopted in 2010 and directed to Wireless Access in Vehicular Environment (WAVE). It uses the physical layer of the 802.11a standard and an OFDM modulation. A bandwidth of 30 to 75 MHz (depending on countries) around the 5.9 GHz frequency is selected. T/R modules should allow a range of communication of about 1 km in LOS. This is half the bandwidth or double the transmission time when compared to a 802.11a implementation. This design choice allows for a better handling of the reflections on neighboring vehicles.

The V2V and/or V2I communication link(s) 241 may be alternatively implemented using a public or private cellular network, although latency due to the base stations and the network management layer may create performance issues when compared to a point-to-point DRSC link. Public networks will comply with the 3GPP (or lower) standard, or the LTE or 5G standards. An advantage of using a communication link operated by a network is that it possibly offers an additional source of localization because the base stations have a well known position that can be included in the best fit calculation of a position of a rover according to some embodiments of the invention that are explained further down in the description.

Communications may be with another vehicle or with an Access Point alongside the road travelled by the vehicle. V2I communications may be one-sided or two-sided. V2C communications are generally two-sided.

In some embodiments, the V2V and/or the V2I communication link 241 may serve as the sensor of the V2V and/or V2I position estimation unit 231. It is always possible to use a communication link at least as a range measurement sensor, by having a procedure whereby the TOA of certain frames is measured, thus allowing computation of a TOF and a distance travelled. When the T/R modules use antennas with a certain level of diversity, it is also possible to add a DOA measurement functionality by computing differences in TOA to the different physical or virtual antenna elements. Simple calculations may be applied to determine a confidence index of the measurements, for instance by computing a variance of the measurements over a period of time. It is also possible to statistically determine an index of availability of said measurements, based on historical data that are stored.

DSRC has been designed to be more multi-path reflections resistant than 802.11a. Also, some processing may be added to further mitigate the effect of multi-path reflections, such as the one disclosed in European patent application filed under n°EP16306153.4, assigned to the same applicant as the applicant of the instant application.

Other types of V2V and/V2I links may be used as a substitute to those described so far. For instance the V2I link may use a satellite communication transport layer. Both links may use optical transport layers, for instance if Visual Light Communication links are available.

According to the invention, the V2V and/or V2I communication links are configured to transmit the output of the rover PVT computation unit, either to other vehicles around said rover or to a processing centre. Advantageously, the transmitted data will be conditioned in the NMEA format. Advantageously, the sampling of the measurements will be chosen so that the interval of transmission and calculation of a confidence index is consistent with the speed of the vehicles. In some variants, the NMEA data may comprise a number of satellites with which the PVT is computed, including their constellation of origin. In some variants, that may be combined with the previous ones, the NMEA data may comprise a value of a Dilution of Precision of the PVT computation.

In some other variants, raw data may be also acquired and configured to be sent to the other rovers. Raw data such as ephemeris data, instantaneous or forecast, and Doppler values. Raw data may be available in a RTCM format or in a proprietary format. Raw data may be useful to better ascertain the Figure of Merit (FOM) and the integrity of the PVT computed data. However, a compromise will have to be made between, on one hand, the processing power of the calculating units 251 of the rovers, the data rate of the V2V or V2I communication links 241, and on another hand, the increase of the precision and confidence index achieved thanks to the said raw data.

Peer-to-peer communications may be implemented using a Publish/Subscribe (or PubSub) protocol, whereby a user publishes on a address the classes of messages that it will post, possibly with criteria that a subscriber should fulfill to be authorized to access the data. Publication may be for use of users in a predetermined range of the publishing rover. Rovers authorized to access Published data of a certain class may be only able to either actually Subscribe or physically get access to, when within a predetermined range of the Publishing rover. A PubSub architecture offers the advantage of diminishing traffic over the network and offering better control of the information. As an option, data may be transmitted from a rover to a second closest rover and from the second rover to a third rover, applying the daisy chain principle.

The calculation unit 251 receives input from the PVT calculation unit 221, the V2V and/or V2I position estimation unit 231 and the V2V and/or V2I communication link 241. Advantageously, data transmitted to the calculation unit are time stamped. Time-stamping of the PVT data is native. Advantageously, the GNSS time may also be used to time stamp the output of the position estimation unit. Advantageously, the data transmitted to/from the calculation unit may be encrypted or scrambled to avoid or mitigate interception and/or tampering.

The calculation unit may use a standard processor, or a ruggedized processor fit to being embedded on a vehicle. The calculation unit may include a secure processor to generate encryption keys. The calculation unit may have a duplicate calculation unit, for redundancy and certification purposes. The calculation unit will preferably have access to parameters or dynamic data stored short term, medium term or long term, locally or on a server. The calculation unit will implement algorithms to determine a most probable position of the rover, with reliability and integrity indexes. These algorithms will be discussed in detail further down in this description.

Various options to implement the invention are possible in terms of prior registration and identification of the users. On one hand, because the data that is shared between the rovers may be mission and safety critical, it is advantageous to be able to control that the rovers sending information to other rovers or to a centre "do not play the fool", either on purpose or by negligence. This would lead to a process whereby a central authority would be needed to authorize registering of a user. On the other hand, the more users are registered, the highest the quality of the results of each position calculation. And some potential users may be dissuaded from adhering to the system because of concerns about protection of the privacy of their localization data. Both options are technically possible. A good compromise seems to create and maintain a specific system ID that would be managed by a system management authority with high confidence credentials. This ID would be attached to all localization messages but could only be tracked to the personal ID of the user on requisition of judicial authorities (depending on local applicable law and jurisdiction).

In order to preserve privacy of rover locations, the system may also include an anonymizing embodiment of user IDs. A confidence level of the location may either be used in addition to, or as a replacement of, user IDs. For example, users which contribute to the location according to the invention, which also have previously contributed to the location with data that resulted to an improvement on the location, may be considered as "more trusted user". Therefore, the system may favor a contribution from such users more than a contribution from a user with low or non-existent confidence level. In addition, users who have contributed with abnormal or low precision location information will see they confidence level diminish. In one embodiment, location data may be sorted by confidence level, from high to low. Computed location may use this information to calculate a precise location with a high confidence level. In addition, computation can also be conducted with data with a lower confidence level as a way to grade contributor's confidence level for further contribution.

In some embodiments, the system comprises a Navigation assistance centre 260. The Navigation assistance center may receive position information from the rovers through the V2I communication links. The Navigation assistance center may then process the position information and retransmit relevant results to some or all rovers in an area. The Navigation assistance center may be configured to determine route histories and/or planning parameters that may be used for future route planning, depending on certain characteristics of the users, the traffic, the advent of periodic events, etc.

The existence of a Navigation assistance centre is technically purely optional, since peer-to-peer communications work quite well. But it may be important from a user experience or marketing point of view, because a central data centre with a large enough number of users in a definite area may be able to collect, process and provide additional data that may be very valuable to the users, such as real-time traffic data, alternative routes proposals, etc.

In some embodiments, the Navigation assistance center may be global for all users. In other embodiments, it may be accessible to a community or a group of users. It may be regional or defined by country or state to be compliant with the law in place. In other embodiments, it can be local and information may be stored locally at the user terminal or cloud account. In another embodiment, it can be a combination of the above solutions. As a result, a user may share data, past and/or current, limited to a route or a group or routes, past, present and or future.

Figure 3:
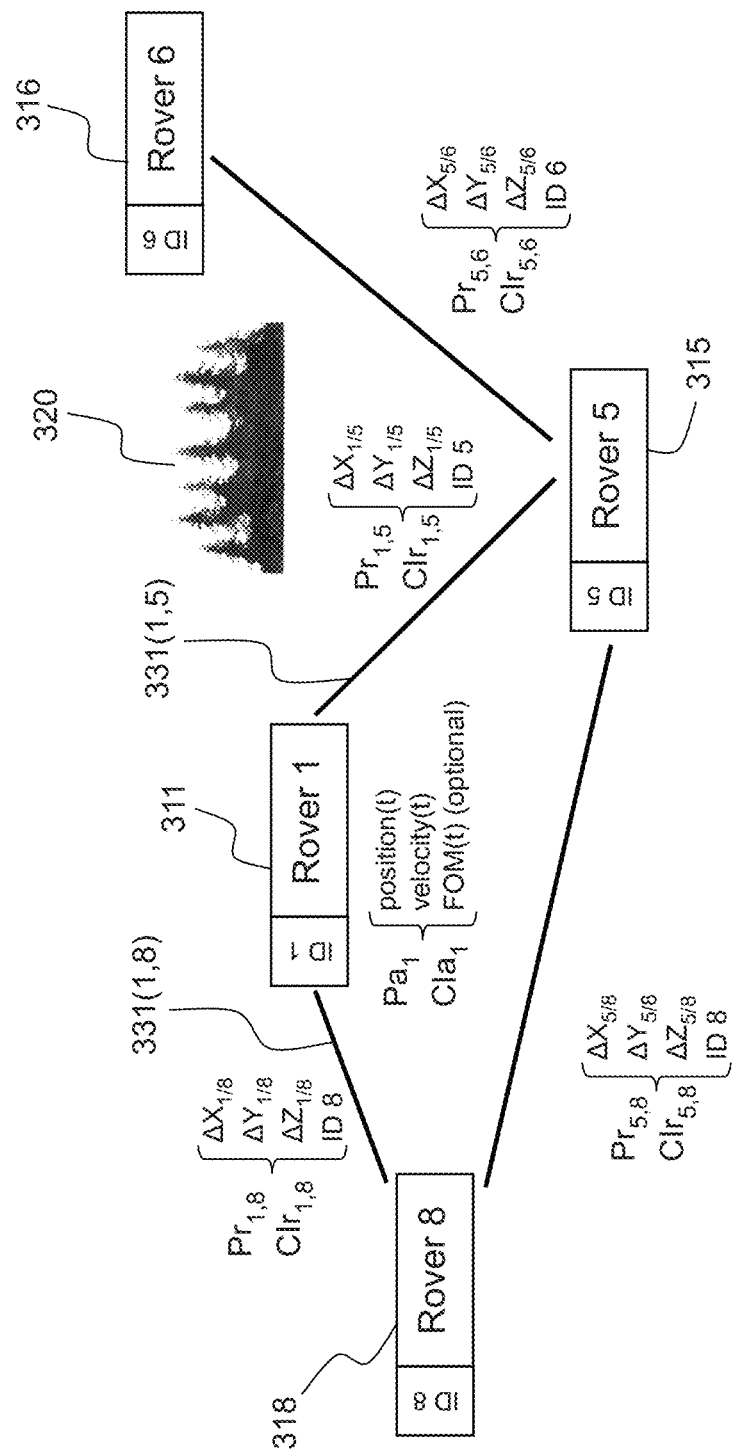
FIG. 3 represents another functional architecture to implement the invention according to some of its embodiments.

FIG. 3 represents a use case of the functional architecture to implement the invention according to some of its embodiments.

In the configuration of the figure, Rover 1, 311, Rover 5, 315 and Rover 8, 318, are in LOS. Rover 6, 316 is not in LOS either with Rover 1 or with Rover 8, because of the trees 320. Rover 6 is though in LOS with Rover 5. Rover 1 will be able to directly measure $\Delta X(t)_{1,5}$, $\Delta Y(t)_{1,5}$, $\Delta Z(t)_{1,5}$ that are its relative coordinates in relation to Rover 5 and $\Delta X(t)_{1,8}$, $\Delta Y(t)_{1,8}$, $\Delta Z(t)_{1,8}$ that are its relative coordinates with Rover 8. Datasets need to be labelled with the respective IDs of the rovers, the IDs being possibly certified by secure processors in the calculators of the Rovers, as contemplated earlier in the description. Datasets will also preferably comprise the FOM of the relative position measurements. Likewise, Rover 5 may directly measure $\Delta X(t)_{5,1}$ $\Delta Y(t)_{5,1}$ $\Delta Z(t)_{5,1}$ to Rover 1, $\Delta X(t)_{5,8}$, $\Delta Y(t)_{5,8}$, $\Delta Z(t)_{5,8}$ to Rover 8 and $\Delta X(t)_{5,6}$, $\Delta Y(t)_{5,6}$, $\Delta Z(t)_{5,6}$ to Rover 6 (and acquire and/or calculate corresponding IDs and FOMs). Likewise, Rover 8 may directly measure $\Delta X(t)_{8,1}$ $\Delta Y(t)_{8,1}$ $\Delta Z(t)_{8,1}$ to Rover 1 and $\Delta X(t)_{8,5}$, $\Delta Y(t)_{8,5}$, $\Delta Z(t)_{8,5}$ to Rover 5 (and acquire and/or calculate corresponding IDs and FOMs). Likewise, Rover 6 may directly measure $\Delta X(t)_{6,5}$, ΔY(t)$_{6,5}$, ΔZ(t)$_{6,5}$ to Rover 5 (and acquire and/or calculate corresponding Ids and FOMs).

Each of the Rovers may transmit either directly or indirectly data to each of the other rovers. Transmission will use one of the communication links described in relation to FIG. 2. Basically, data will be transmitted by Rover 1 to the other Rovers 5 and 8 that are in LOS with Rover 1, if the communication link is a V2V LOS link, and to Rover 6, if the communication link is a V2V Non-LOS link. Likewise, for the other Rovers.

Each individual Rover is configured to calculate at the output of the GNSS receiver a first position P1 (including FOM) in its own GNSS PVT unit, and a second position P2 in the calculating unit 251 that uses as input P1, at least one of a group of absolute GNSS positions received from the other Rovers in LOS or in Non-LOS communication with the individual Rover, and its direct measurements of the relative positions to the other Rovers. Optionally, the relative positions measured by the other Rovers may be transmitted from said other Rovers to the individual Rover through the V2V communication links. Thus, in this option, the positions of some of the other Rovers that are not in LOS with the individual Rover may also be acquired and processed in the calculation unit 251 to improve the calculation of position P2, said calculation being detailed in the part of the description in relation to FIGS. 5 and 6. In another option, reciprocal relative position measurements from an individual Rover to some other Rovers may be compared to further refine a FOM of the relative positions determinations at the individual Rovers.

It is to be noted that some of the variants may be implemented, alone or in combination with another variant, only at some of the individual Rovers, without departing from the scope of the invention.

Also, as explained in relation to FIG. 2, the V2V communication links may be used as relative position determination units. This may be the case for some and not all of the Rovers participating to the collaborative process of the invention.

Also, the calculation unit 251 may be coupled with a database containing IDs of the Rovers subscribing to the cooperative positioning system. But, identification may be only the result of the V2V communication protocol that may include a one-to-one authentication protocol or of a PubSub protocol.

Figure 4:
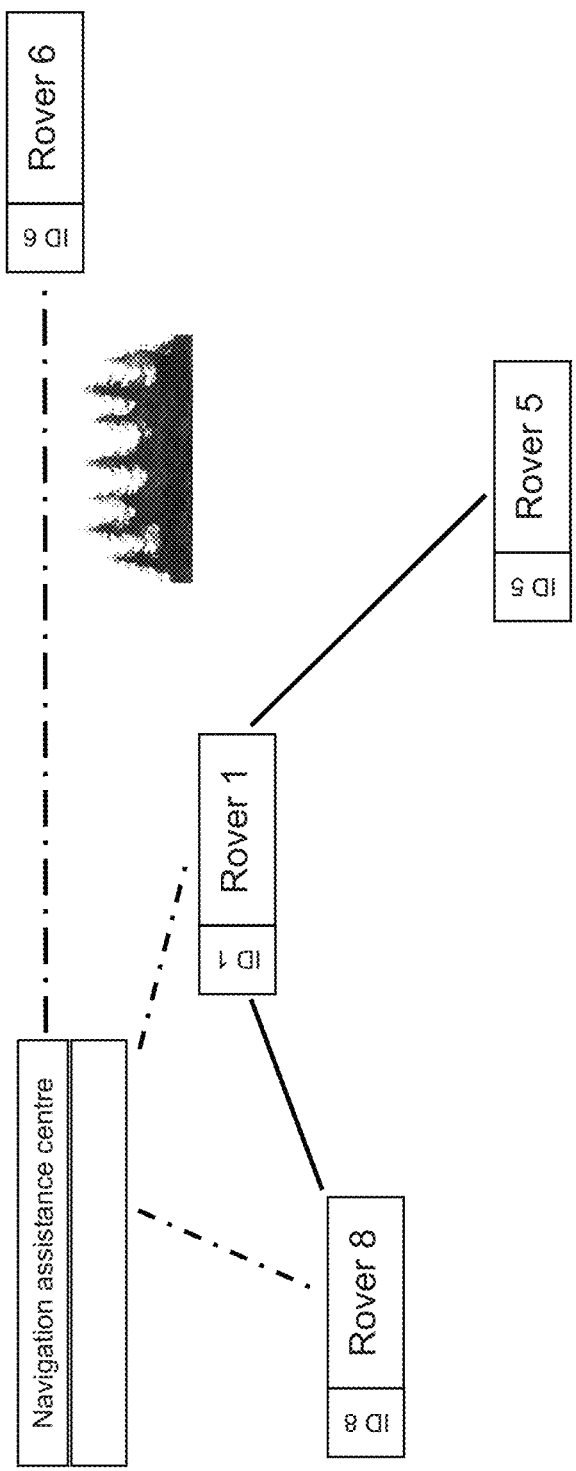
FIG. 4 represents another use case of the functional architecture to implement the invention according to some of its embodiments.

FIG. 4 represents another functional architecture to implement the invention according to some of its embodiments.

This other functional architecture comprises a data centre 260, the function of which was already commented upon in relation to FIG. 2. In this architecture, the measurements of the relative positions between Rovers are performed as already explained in relation to FIG. 3. But the communication of data (GNSS and/or relative positions) may be transmitted to the Navigation assistance centre 260 by some or all of the Rovers through a V2I communication link. The Navigation assistance centre may retransmit the received data to some or all of the Rovers on a V2I communication link, without any specific processing. The Navigation assistance centre may optionally perform a filtering, by eliminating data received from an untrusted Rover (eg. if this Rover has been rated as prone to spoofing or tampering) or from an untrusted location (eg. if the location is recorded as being severely affected by multipath reflections, either at a moment in time or always), or data that are redundant and come from Rovers that have a high DOP, a qualification of the measurements and/or the confidence indexes based on the data themselves, their history, or a map matching verification, a calculation of blended data, either to remain compatible with the available data rate of the communication data, or because the confidence index of blended data is higher than the confidence index of the individual data, at a moment in time. Some and not all of these variants may be applied by the processing of the Navigation assistance centre without departing from the scope of the invention. To practice some of these variants, the Navigation assistance centre may have a database of the Rovers subscribing to the cooperative positioning system. But, identification may be only the result of the V2I communication protocol that may include a one-to-one authentication protocol or of a PubSub protocol.

Figure 5:
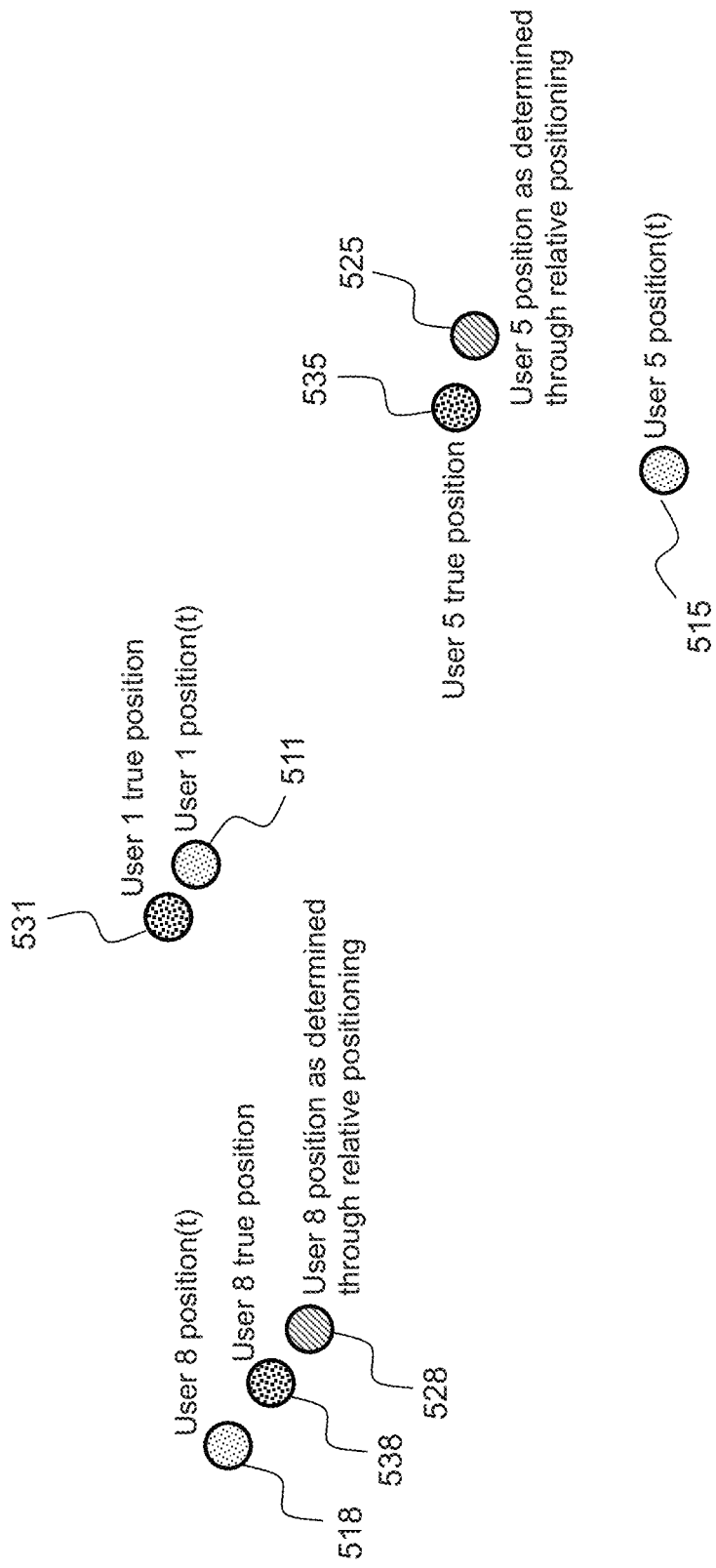
FIG. 5 illustrates a use case of the method of the invention to determine a position of a vehicle according to some embodiments of the invention.

FIG. 5 illustrates a use case of the method of the invention to determine a position of a vehicle according to some embodiments of the invention.

FIG. 5 illustrates a case where Rover 1 of FIGS. 3 and 4 acquires at time t GNSS PVTs, IDs and FOM 515, 518, respectively of Rover 5 and Rover 8 also displayed on FIGS. 3 and 4. Rover 1 also calculates, in its V2V position estimation unit 231, relative positions, IDs and FOMs 525, 528, respectively of Rover 5 and Rover 8. GNSS positions 515, 518, and relative positions 525, 528, may be acquired through a V2V communication link. Optionally, some of these positions may be acquired through a V2I communication link. Rover 1 knows its GNSS position 511 (P1). The calculation unit 251 of Rover 1 is configured to calculate its own true position 531 (P2) from its GNSS position 511, the GNSS positions of Rover 5 (515) and of Rover 8 (518), and the relative positions of Rover 5 (525) and of Rover 8 (528). According to the invention, various algorithms may be implemented in calculation unit 251 of Rover 1 to compute the true position 531 (P2). In some embodiments, some of the GNSS positions 511, 515, 518 may not be available, while the calculation unit is still able to calculate a true position of Rover 1. If a current GNSS position 511 of Rover 1 is not available at time t, if may replaced by a synthetic position calculated by propagating a last available position of said Rover 1, using a last known velocity and direction of motion (known for instance by the navigation system of Rover 1). Also, one of the relative positions 525, 528, may not be available at the calculation unit 251 of Rover 1, while the calculation unit is still able to calculate a true position of Rover 1. The true positions 535, 538, respectively of Rover 5 and Rover 8, may also be calculated by the calculation unit 251 of Rover 1. One of the algorithms to calculate these true positions is illustrated by FIG. 6 that is discussed below.

Of course, positions of more than two other rovers may be acquired at Rover 1, without departing from the scope of the invention.

Figure 6:
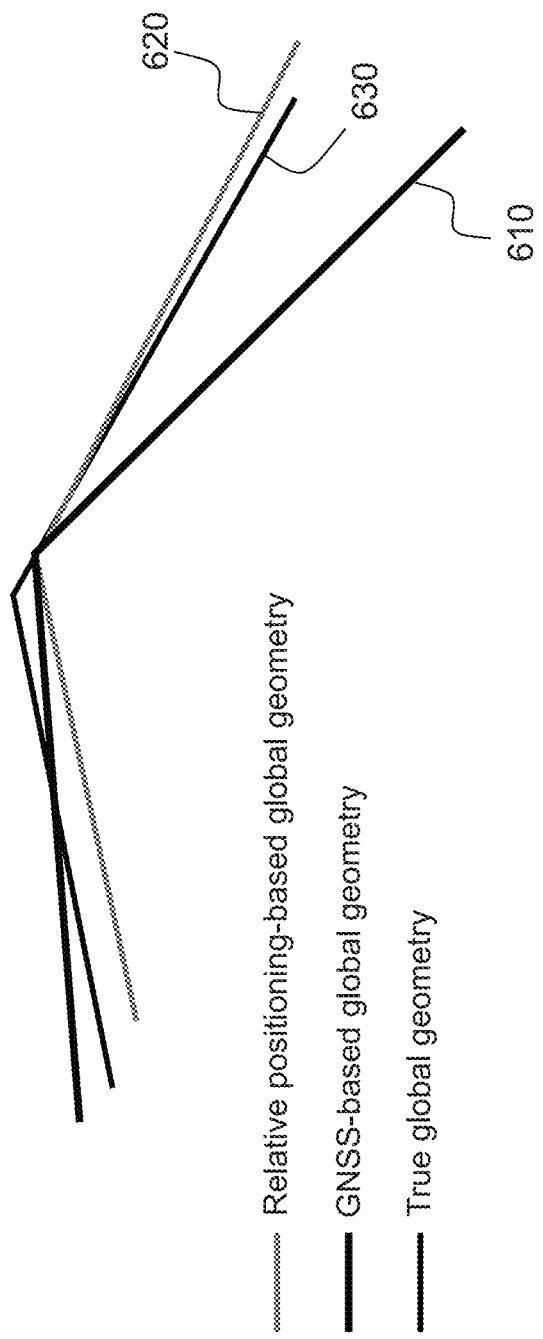
FIG. 6 illustrates an algorithm to determine a position of a vehicle according to some embodiments of the invention.

FIG. 6 illustrates an algorithm to determine a position of a vehicle according to some embodiments of the invention.

According to some embodiments of the invention illustrated on FIG. 6, the calculation unit 251 of Rover 1 calculates a geometry 610 of lines connecting the GNSS position of Rover 1, 511 to the GNSS positions 515, 518 of Rover 5 and Rover 8, respectively, acquired as discussed above in relation to FIG. 5. In some variants, the geometry 610 may be calculated by taking into account the FOMs of the GNSS positions. A best fit may be determined segment by segment or globally, by a least-square adjustment of the positions 511, 515, 518. The GNSS positions may be weighted by their FOM in the regression, the GNSS positions having a better FOM being affected with a higher weight.

The calculation unit also calculates a geometry 620 of lines connecting the GNSS position 511 of Rover 1 to the relative positions 525, 528, respectively of Rovers 5 and 8. The geometry 620 may also be optionally adjusted as already described for geometry 610.

The calculation unit 251 of Rover 1 then calculates a geometry 630 of lines connecting true positions 531, 535, 538, respectively of Rover 1, Rover 5 and Rover 8. According to some embodiments of the invention, the geometry 630 is calculated by a best-fit of geometries 610 and 620. By way of example, the best-fit calculation may use a least-square calculation to determine series of points at which the sum of the Euclidian distances of selected pairs of points of segments of geometries 610 and 620 is minimal. Then, linear regressions are applied, segment by segment. The selection of the number of pairs of points of each segment may be made to optimize the calculation time in view of a preset level of confidence. The selection of each individual pair is then made by a regular decimation on each of the pairs of segments. Optionally, the selected points of geometries 610, 620 may be weighted in the Euclidian distances calculation by the confidence index of the measurement of the rover position from which the segment of geometries 610, 620 was determined.

According to some other embodiments, the true position of Rover 1 may be calculated without building intermediate geometries. A best-fit using a least-square Euclidian distance minimization criteria of a plurality of vector estimates generated to connect a number of estimated GNSS Rover 1 positions within its circle of confidence to the other rovers positions, whose GNSS and/or relative position measurements are available to Rover 1, each other rover position being deemed to be located at an intersection of the circles of confidence of the GNSS position and the relative position. A sampling of the possible segments is then performed and a circle of confidence may then be drawn that gives the locus of the estimates of the true positions of Rover 1. This circle of confidence is the smallest circle including the other rovers' GNSS and/or relative positions which have been acquired by Rover 1.

According yet some other embodiments, the confidence circle of each other Rover that is available to Rover 1 is fragmented in a lattice of circles/squares/rectangles/triangles or, more generally any kind of small features, and Rover 1 and the other rovers are determined to be located at a position in each of the lattices so that the geometry of the rovers at these positions (Rover 1 plus the other rovers) is the best fit to the geometry of the relative measurements and the distance of each rover to the centre of its absolute position confidence circle is minimal. The calculation may be systematic (i.e. "brute force") or some filtering may be first applied. For instance, it may be advantageous to exclude the positions in a lattice that would determine a rover-to-rover distance that would be outside the range of confidence of the relative measurements. Or a limit to the number of brute force calculations may be set, the calculations being applied to a selection of the full set of points of the lattice, said selection being based on a pre-sorting of the points in the lattice having a higher index of confidence of the relative measurements.

Multiple variants may therefore be implemented without departing from the scope of the invention. According to the invention, a combination of these variants may be envisaged with the idea that the geometry determined by the relative positioning of rovers should generally be considered as having a higher global index of confidence than the absolute positioning, because the latter is more often impaired by the receiving conditions, especially multipath reflections. Then a number of filtering, sorting or combination methods of the measured points, points in a lattice around a centre of a confidence circle, vectors connecting the measured points or points in the lattice may be used. The combinations may use different best fit algorithms known to the person of ordinary skill.

The invention may provide real-time information that can be implemented in future standards. The integrity of the position and/or velocity and/or time may take the form of legally binding information. An autonomous car may use this information to drive autonomously only if the integrity level is above a defined value that can be set dynamically for different use cases, such as different driving conditions (freeway, country roads, urban environment, etc.). If this defined value diminishes, the user may be alerted to take control of the vehicle. A fall-back protocol may also be run, such as reducing speed and using other sensors, in a similar manner to airplanes autopilot protocols.

In other embodiments, past measurement may be stored and be used to later analyse issues. In the case of an accident, this information may be used to reconstruct the sequence of events. Logged data may be used with different privacy levels. For example, governments or car insurance companies may not necessary get rights to the same data.

The invention may also be used to detect and in some cases contribute to locate spoofers or jammers sources. Location may work for static location and for dynamically moving sources.

The invention offers new and complementary solutions to better and safer navigation in multipath environments. A single vehicle may detect when subjected to multipath. Existing state of the art techniques may be used to correct the position affected by multipath errors. However, not only these techniques, are not fool proof in all cases, but they also create additional complexity for the vehicle equipment and entail a significant additional cost. To illustrate the benefit of the invention, a rover entering a multipath area may benefit from one or more rovers located outside the area, not subject to multipath or themselves benefiting from other rovers, and so on, in a chain like composition. For illustrative purposes only, some examples of applications are: a rover in a tunnel, a vehicle which was in an open crossroad and is now in a street between buildings, a vehicle driving through multiple passageways or freeways entrance and exits, a vehicle entering or exiting an underground garage, a vehicle moving under trees, a UAV flying between warehouses or containers.

The invention may also have other applications which derive from the benefit brought by other rovers to one rover of interest. The information of multiple rovers may be transmitted to multiple rovers at once. To better understand the benefit of the invention for multiple rovers, a traffic jam forming on a freeway is a classic example. As it has been extensively explained in the literature, a traffic jam on a freeway is created by only a few cars. In a simplified description, a first car brakes. A car behind it brakes harder but after a delayed reaction. This delayed reaction and this braking difference create a wave-like phenomena which amplifies over time and propagates back on the road. As a result, cars coming to the initial "braking" location may be subjected to a traffic jam despite the fact that no accident caused this traffic jam. In the case of such traffic jam, the velocity of the PVT information, and its variation over time of one or more rovers at the beginning of a traffic jam may be used by other vehicles behind it to anticipate the traffic jam formation, to adapt speed in advance and smooth the phenomenon instead of amplifying it.

Transmission of the information may be conducted using vehicle going in the same direction as presented in the example above. In other embodiments, the information may be transmitted through incoming vehicles, on the other side of the freeway for example to propagate the information faster. In another embodiment, local or static access may be used. For example, some freeway uses information media and/or panel display.

Patterns as illustrated in the traffic jam example may be predicted with state of the art algorithms. A person of ordinary skill may use these methods for any appropriate cases such as roundabouts, traffic lights, stop signs, merging lanes, . . . .

Throughout the invention, the term position may be understood as PVT position. Therefore, Position, Position over time, Velocity, Velocity over time and any combination are equivalent for the invention. Acceleration or deceleration of a vehicle which may also be computed through other sensors such as accelerometers may be derived from the invention using the variation of speed over time information from the PVT information.

Figure 7:
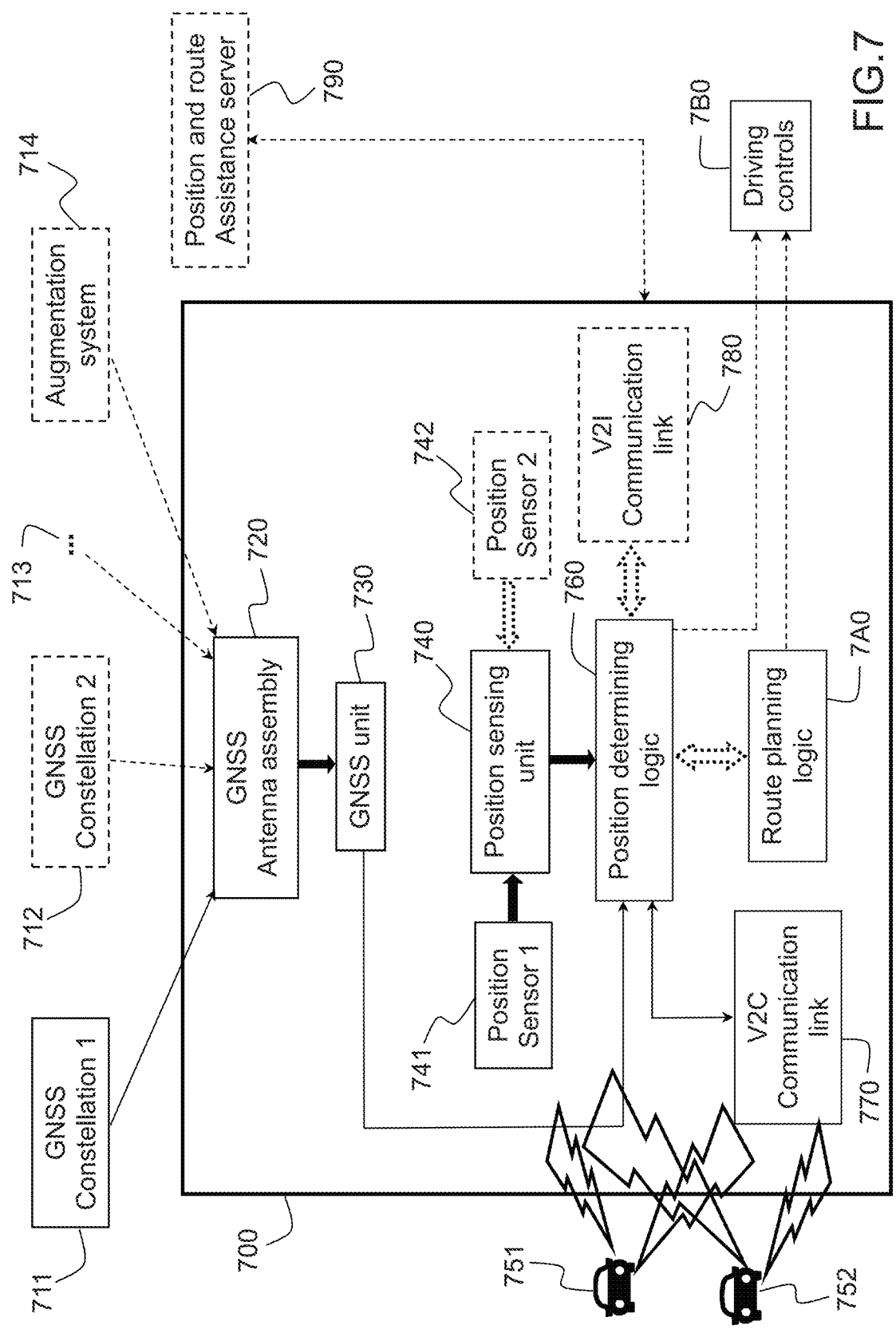
FIG. 7 represents a possible physical architecture located on-board a vehicle to implement the invention according to some of its embodiments.

FIG. 7 represents a possible physical architecture located on-board a vehicle to implement the invention according to some of its embodiments.

As displayed on FIG. 7, a vehicle positioning device 700 according to some embodiments of the invention comprises a GNSS antenna assembly 720. The antenna assembly may be a standard omni-directional antenna fit for receiving RF signals in the L band, that is the frequency band where all the GNSS constellations transmit their signals. The antenna arrangement may be an antenna of a patch type or of another type. It may comprise a number of elements allowing the arrangement to reach a certain level of antenna diversity. It may be right-hand polarized (RHP) or left-hand polarized (LHP) or comprise a combination of elements, that are each RHP or LHP polarized. It may comprise a field of view (FOV) sensor configured to let only the LOS signals reach the antenna elements or to drive antenna elements in the arrangement to determine a radiating pattern that is configured to only capture the LOS signals. It may comprise a radiating pattern generator driven by a pseudo-random sequence (PRS) generator that is then used to certify that the GNSS signals are likely to be authentic.

The GNSS antenna assembly may be fit for receiving positional signals from a plurality of constellations 711, 712, 713, possibly on a plurality of frequencies for each constellation, or some of them. Some of the frequencies may be dedicated to reserved service, the reservation being possibly to government authorities or commercial subscribers.

The GNSS antenna assembly may also be fit for receiving signals from an augmentation system 714 that may be ground based, satellite based or a combination of both, like EGNOS.

The GNSS antenna assembly may be a part of an antenna arrangement configured to also transmit/receive other type of signals such as cellular communication signals, Wi-Fi signals, DSRC or others.

Positioning device 700 also comprises a GNSS receiver 730 that processes the GNSS signals received from one or more constellations, 711, 712, 713 and possibly error corrections (tropospheric, ionospheric, etc. . . . ) from an augmentation system 714. GNSS receiver 730 comprise a number of processing channels, each of one configured to calculate a time-stamped pseudo-range vector connecting the receiver to a satellite in LOS, with an associated FOM or UERE. A PVT calculation unit integrated in the GNSS receiver 730 receives the calculated pseudo-ranges from all processing channels and derives the PVT measurement with associated FOM or UERE.

Positioning device 700 also comprises a position sensing unit 740 that receives positioning signals/data from Position sensor 1, 741 and possibly, Position Sensor 2, 742. The types of position sensors that may be adequate to implement the invention have already been commented upon above. By way of example, Position Sensor 1, 741, is capable of measuring relative positions of items 751, 752 to the positioning device 700. In some embodiments, the items 751, 752 are other rovers. In some other embodiments, they may be RF transponders or modulated light transceivers or receivers that are positioned at fixed points with known absolute coordinates along the roads.

Positioning device 700 also comprises a position determining logic 760 that receives the output from GNSS receiver 730 and Position sensing unit 740. The Position determining logic 740 is also configured to transmit/receive data through a V2V communication link 770. Said data may comprise the GNSS positions from other rovers in the vicinity that are also subscribers to the same position collaborative improvement service or to another system of the same type having a data sharing agreement with the said service. Said data may also comprise relative position data to other rovers (that are the reciprocal measurements of those calculated by the Position sensing unit 740 or are relative measurements from a rover that is in LOS to a rover in LOS to Rover 1 but in Non-LOS to Rover 1—e.g. Rover 6 in relation to Rover 1 on FIGS. 3 and 4). The V2V communication link may be the one of Position Sensors 1 and 2.

Hence, in some options, the communication link 770 may acquire relative positions of some rovers (one or a plurality) that are or are not in LOS of Rover 1 and are not acquired directly from the one or more rovers that are in LOS, and this or these relative position(s) may be then processed by the Position determining logic 760 in addition to the positions of the one or more rovers in LOS.

Data to be input in the Position determination logic 760 may be acquired totally or in part, not through the V2V communication link 770, but through a V2I communication link 780 that connects the subscribing rover to a Navigation assistance server 790. The communication link 780 may enable the Position determination logic 760 to acquire the positions (GNSS or relative) of some rovers (one or a plurality) that have been acquired at the Navigation assistance server 790 through its communication links to these other (some) rovers. The Navigation assistance server 790 may be managed by a Navigation assistance service management (NASM) entity that manages the IDs of the subscribers, including their registration that may need background checking to allow delivery of an ID certificate with authentication and possibly signature and/or encryption features, The Navigation assistance may manage the repudiation of the ID certificates. It may also maintain a database of the hardware and software configurations of the subscribers (vehicle, GNSS receiver, relative position data sensors, processing units, etc.). It may also maintain a database of route histories of the subscribers, subject to privacy regulations applicable in the jurisdictions where the NASM entity operates. In addition to the transmission of the subscribers' GNSS positions data, including FOM, in an area of travel of a subscriber and possibly of the relative positions, the NASM entity may also transmit to its subscribers other navigation assistance data, such as congestion, roadwork and deviation information, meteorological information, POI information, or news.

Optionally, the Positioning device 700 may also comprise a Route planning logic 7A0 in mono or bi-directional communication with the Position determining logic 760. The Position determining logic may send to the Route planning logic the output of its calculations of the other surrounding rovers so that they can be represented on a map that displays the actual and planned route of the rover. The display may include confidence results of one or more of the two sets of measurements. The Route planning logic may also send to the Position determining logic third, and possibly fourth, estimate of the positions of the other rovers based on an adjustment of the GNSS position and the relative position by a map matching algorithm.

As a further option, the Positioning device 700 may also comprise a connection from the Position determination logic 760 and/or the Route planning logic 7A0 to the Driving controls 7B0 of the rover. In some embodiments, the Position determination logic may be configured to estimate a probability of collision with other rovers, pedestrians, animals or items of the infrastructure. Based on such estimates, collision avoidance commands may be triggered by the Driving controls, such as Emergency breaking, lane change, etc. . . .

It is to be noted that the Position sensing unit may execute the Position determination logic 760. Alternatively, the two logics may be executed by different processors.

Figure 8:
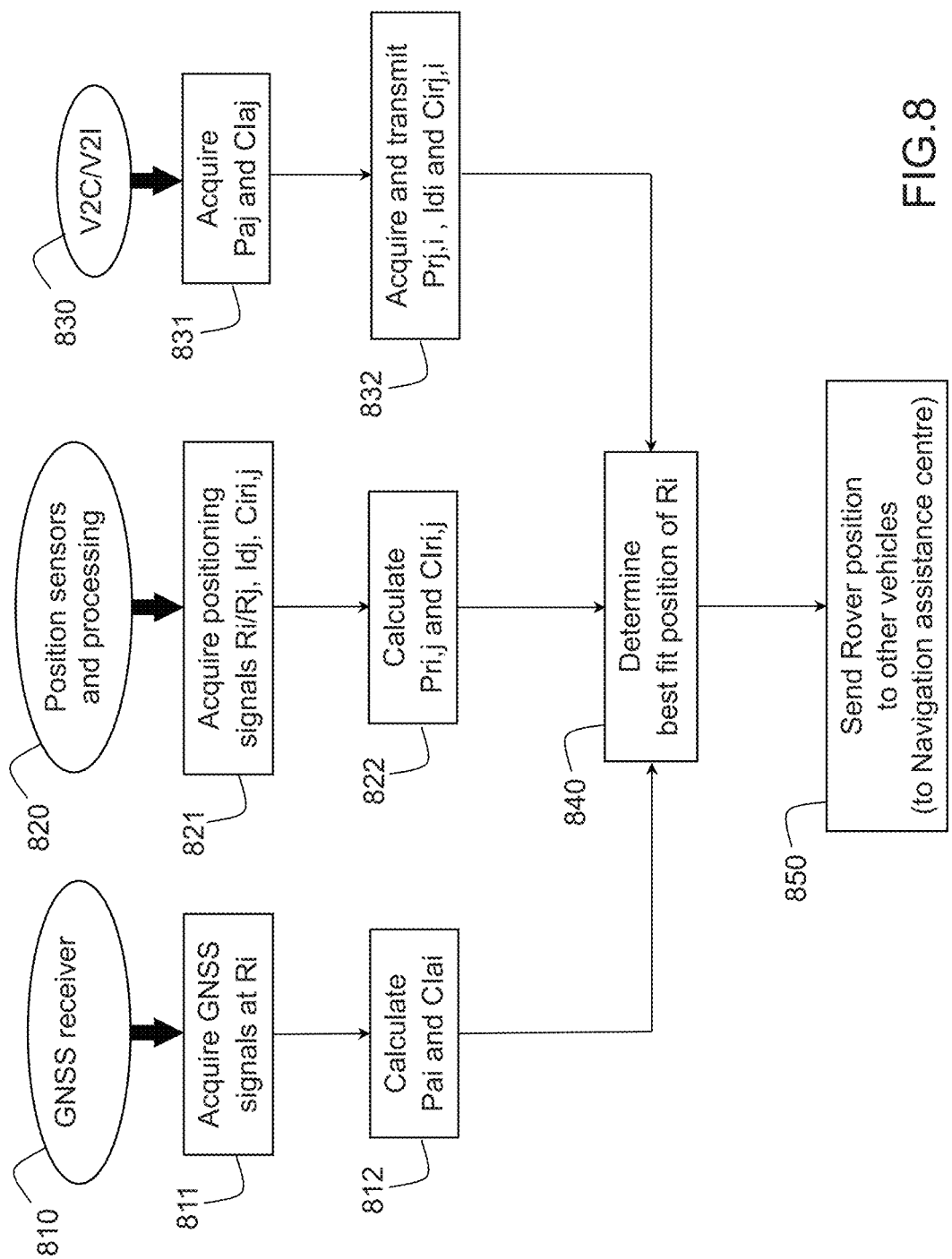
FIG. 8 displays a flow chart of the method of the invention according to some of its embodiments.

FIG. 8 displays a flow chart of the method of the invention according to some of its embodiments.

The method of the invention preferably comprises three processing branches, a first one 810 performed in the GNSS unit of the rover 730, a second one 820 performed in the Position sensing unit 740 and a third one 830 performed by a processing of the data acquired by one of more of the V2V/V2I communication links.

Branch 810 comprises a step 811 to acquire GNSS signals at rover $R_i$ and a step 812 to calculate an absolute position $Pa_i$ (P1) of $R_i$ and its confidence index $CIa_i$.

Branch 820 comprises a step 821 to acquire positioning signals of rover $R_i$ to rover $R_j$ ($R_i/R_j$) and the identifications ($ID_j$) of rovers and a step 822 to calculate the relative positions $Pr_{i,j}$ of rovers $R_i$ and $R_j$ and their confidence indexes $CIr_{i,j}$.

Branch 830 comprises a step 831 to acquire the absolute GNSS positions of rovers $R_j$, their IDs and the confidence indexes $CIa_j$ of the absolute GNSS positions and, optionally, a step 832 to acquire from rovers $R_j$ the relative positions $Pr_{j,i}$ they have calculated with the other rovers in a predetermined area around rover $R_i$. In a preferred embodiment the predetermined area may be about 100 m wide or a few hundreds of meters wide. The predetermined area may optionally vary dynamically with the position of rover $R_i$. This step may also optionally comprise the acquisition of the confidence indexes $CIr_{j,i}$ of the relative positions $Pr_{j,i}$.

Then the output of branches 810, 820, 830 are fused in a step 840 to determine a best fit or true position P2 of rover $R_i$. The calculation of the true position P2 of rover $R_i$ was explained in relation to FIG. 6.

A number of variants of the best fit calculation may be implemented without departing from the scope of the invention. More specifically step 831 or step 832 may not be implemented. In step 840, filtering steps to eliminate some measurements may be implemented. Weighting of the measurements, based notably on the confidence indexes of the measurements may be performed. The optimization may be implemented segment by segment (a segment connecting two rovers $R_i$ and $R_j$) or globally. Some or all of the optimization steps may be implemented using a least-square calculation of Euclidian distances or of other type of distances. Some or all of the optimization steps may use additional data, such as data coming from other sensors on-board rover Ri or on-board rovers Rj. Such sensors may be heading or attitude sensors or odometers. Other data that may be used, such as mapping data, that may be provided by a Route planning logic 7A0 of rover $R_i$ or of some of rovers $R_j$.

Also, the step to determine the true position of the rovers may be configured to provide a measurement of the availability and a measurement of the integrity of the true position. This will be easily achieved by calculating an overall confidence index of the measurement from the confidence indexes of each measurement, taking into account statistical or predicted availability or guaranteed minima of precisions, given a number of parameters.

A possible approach is to determine $CIa_i$ using the fact that the position dispersion is given by the product of DOP by User Equivalent Range Error (UERE). A unique UERE value can be stored for each GNSS constellation. This can be refined by using a lookup table of UERE as a function of elevation for each GNSS constellation. Preferably, UERE is defined for each GNSS satellite, based e.g. on the broadcast URA (GPS) or SISA (Galileo) values. Even better, timely integrity information for each GNSS satellite can be retrieved from SBAS signals if GNSS unit 730 is capable of processing such signals. Similar considerations, based on intrinsic range measurement accuracy and relative Tx/Rx geometry, can be used to determine CIri,j.

At a step 850, the best fit position of rover Ri may be transmitted or made available through a PubSub protocol to the other rovers and/or to the Navigation assistance server 790.

Electronic, computer and telecom (ECT) equipment vendors have learnt the hard way what it meant in terms of precision, reliability and integrity to design, manufacture, test and maintain equipment fit for the security and safety requirements of aerospace platforms. But these requirements and the challenges of the environment in the aerospace industry may be rated as moderate when compared to what faces the ECT industry to be able to embark positioning equipment on-board vehicles capable of operating in an autopilot mode in a dense urban environment. Thanks to the various embodiments of the invention, that may be implemented on rovers equipped with standard hardware, using software modified according to the teachings of the instant specification, the above challenges may be overcome in an efficient way in terms of cost and user experience. Also, some hardware improvements disclosed in other patent applications that have been mentioned in this specification may still improve the performance of the positioning device of the invention.

The examples disclosed in this specification are only illustrative of some embodiments of the invention. They do not in any way limit the scope of said invention which is defined by the appended claims.

The invention claimed is:

1. A positioning device comprising:
   a GNSS unit configured to acquire GNSS signals from one or more GNSS constellations and to compute a first position of the positioning device based on a PVT calculation from the GNSS signals;
   a position sensing unit configured to acquire relative positions from the positioning device of one or more rovers,
   a communication link configured to make available to the positioning device timestamped GNSS PVT positions of one or more rovers; and position determining logic configured to compute a second position of the positioning device based on the determination of a best fit between the first position of the positioning device provided by the GNSS unit, the one or more relative positions acquired by the position sensing unit and the one or more timestamped GNSS PVT positions, wherein the position determining logic is further configured to compute the second position by calculating a best fit between a first geometry including a first group of segments connecting the first position of the positioning device and each of the GNSS PVT positions of the at least some of the rovers and a second geometry including a second group of segments connecting the first position of the positioning device and each of the relative positions of the at least some of the rovers to the positioning device.

2. The positioning device of claim 1, wherein the best-fit is computed by determining a best-fit segment, points of which have a minimal Euclidian distance to selected pair of points, each point in the selected pair belonging to one of the first group or the second group.

3. The positioning device of claim 1, wherein the position determining logic is further configured to compute the second position by calculating a confidence circle of the second position that is determined as a smallest circle including origins of selected segments connecting a candidate second position to selected points located in an intersection of one or more pairs of confidence circles, wherein a pair of confidence circles is attached to a rover and a first confidence circle in the pair relates to the rover GNSS position and the second confidence circle in the pair relates to the rover relative position to the positioning device.

4. The positioning device of claim 1, wherein the position determining logic is further configured to compute the second position by fracturing confidence circles around the first position of the rover and the GNSS PVT positions of the one or more rovers into a plurality of small features, pairs of a first small feature in a first confidence circle and a second small feature in a second confidence circle determining segments connecting one of the rover and one of the other rovers to another one of the rover and one of the other rovers, a best fit solution being determined by selecting a combination of rovers for which the segments best match a geometry of relative positions of the one and other rovers.

5. The positioning device of claim 1, wherein the position determining logic is further configured to weigh the first position, the one or more relative positions and the one or more GNSS PVT positions with a confidence index associated to the each of the measurements to determine the best fit.

6. The positioning device of claim 5, wherein the position determining logic is further configured to receive and process inputs from a route planning logic, said inputs being used to update the confidence index associated to the first position and the relative positions based on a map matching algorithm.

7. The positioning device of claim 1, wherein the position determining logic is further configured to calculate one or more of an index of availability or an index of integrity of the second position.

8. The positioning device of claim 1, wherein one or more of the GNSS unit and the position determining logic are further configured to generate a first position when none is available at an epoch by propagating a last known first position, using one or more of a velocity or a direction of motion of the positioning device.

9. The positioning device of claim 1, wherein the position sensing unit comprises one or more position sensors with a RF transmit and/or receive (T/R) module, said T/R module configured to measure a range to another T/R module by calculating a time-of-flight between the said T/R modules and to determine an angle of the range by measuring a direction-of-flight between the said T/R modules.

10. The positioning device of claim 9, wherein the communication link is one or more of a vehicle-to-vehicle (V2V) communication link or a vehicle-to-infrastructure (V2I) communication link.

11. The positioning device of claim 10, wherein one or more of the V2V or the V2I communication links are a DSRC communication link.

12. The positioning device of claim 11, wherein the communication link uses a Publish/Subscribe protocol.

13. The positioning device of claim 12, wherein the communication link is configured to transmit and/or receive data to/from a navigation assistance center.

14. A positioning method comprising;
acquiring at a GNSS unit GNSS signals from one or more GNSS constellations and computing a first position of a positioning device based on a PVT calculation from the GNSS signals;
acquiring at a position sensing unit relative positions to one or more rovers, acquiring at a communication link, time-stamped GNSS PVT positions of one or more rovers; and
computing at a position determining logic a second position of the positioning device based on the determination of a best fit between the first position acquired by the GNSS unit, the one or more relative positions acquired by the position sensing unit and the one or more time-stamped GNSS PVT positions,
wherein the position determining logic is further configured to compute the second position by calculating a best fit between a first geometry including a first group of segments connecting the first position of the positioning device and each of the GNSS PVT positions of the at least some of the rovers and a second geometry including a second group of segments connecting the first position of the positioning device and each of the relative positions of the at least some of the rovers to the positioning device.

15. A positioning system comprising:
a plurality of positioning devices on-board rovers, each positioning device comprising:
 a GNSS unit configured to acquire GNSS signals from one or more GNSS constellations and to compute a first position of the positioning device based on a PVT calculation from the GNSS signals;
 a position sensing unit configured to acquire relative positions from the positioning device to one or more rovers;
 a communication link configured to make available to the positioning device time-stamped GNSS PVT positions of one or more rovers; and
 position determining logic configured to compute a second position of the positioning device based on the determination of a best fit between the first position of the positioning device provided by the GNSS unit, the one or more relative positions acquired by the position sensing unit and the one or more time-stamped GNSS PVT positions,
a navigation assistance center comprising: an access to a database of the plurality of rovers, drivers and positioning devices with corresponding IDs; communication links to the plurality of positioning devices, said communication links configured to acquire at least some GNSS positions and/or relative positions of the plurality of positioning devices, wherein the position determining logic is further configured to compute the second position by calculating a best fit between a first geometry including a first group of segments connecting the first position of the positioning device and each of the GNSS PVT positions of the at least some of the rovers and a second geometry including a second group of segments connecting the first position of the positioning device and each of the relative positions of the at least some of the rovers to the positioning device.

* * * * *